Jan. 10, 1961 G. E. GAGNIER 2,967,324
BUMPER ASSEMBLY
Filed May 31, 1957
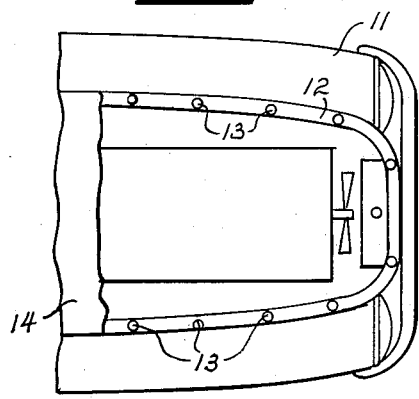
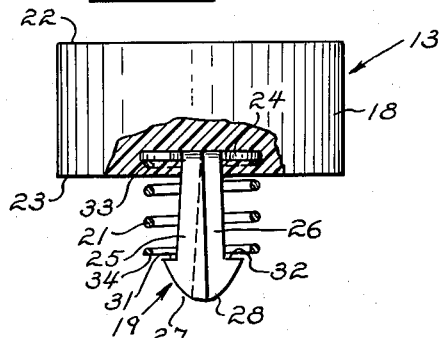
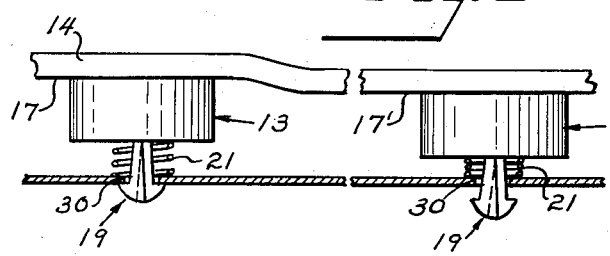
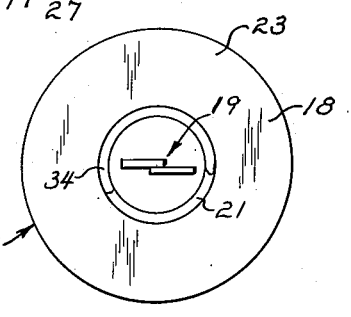
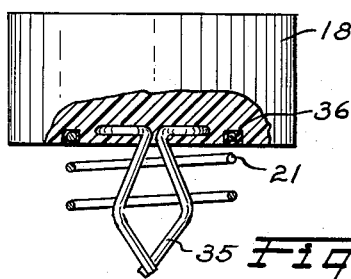
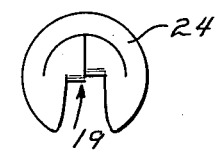
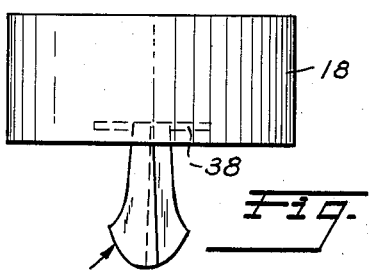
INVENTOR
GEORGE E. GAGNIER
BY Strauch, Nolan & Neale
ATTORNEYS United States Patent Office 2,967,324
Patented Jan. 10, 1961

2,967,324
BUMPER ASSEMBLY

George E. Gagnier, Detroit, Mich., assignor to Gagnier Fibre Products Company, Oak Park, Mich., a corporation of Michigan Filed May 31, 1957, Ser. No. 662,642

11 Claims. (Cl. 16—86)

This invention relates to a special anti-rattle bumper assembly for use mainly in automobiles and vehicles subject to road shock and vibration, and is particularly directed to an asembly of this type that is self-adjusting to maintain snug contact with a coacting closure or like part regardless of irregularities of fit between the parts.

The bumper assembly of the invention is adapted for anti-rattle fit between two normally closed vehicle parts. For example the best known mode of use of the invention is the provision of a series of such bumpers along the vehicle body opening to be contacted by the engine hood to absorb closing shock and prevent rattle when the hood is closed.

It has been proposed, as in the Bumpus et al. Patent No. 2,167,263, issued July 25, 1939, to provide a series of such rubber bumper assemblies along the body edge surrounding the opening closed by the engine hood, and various types of devices for securing the rubber bodies in place have been suggested, but many are complex and expensive, some are unreliable, some require added fastener parts such as nuts that may be lost or shake loose, and all possess a common trouble in that they are not self-adjusting to compensate for space irregularities between the mating hood and body edges.

The accepted commercial practice today in one of the largest production automobiles is to mount rubber bumper blocks along the body opening with a washer and locknut disposed between the bumper block and the body flange, and a screw countersunk in the block passes through it to enter the washer and locknut. Each screw must be individually adjusted to relocate the rubber block and try to obtain contact of all the different rubber blocks with the hood. This is a time consuming exacting operation, usually neglected so that most hoods have rattles, and it is an expensive assembly. This need for individual adjustment is eliminated by the self adjusting assemblies of the invention.

This troublesome problem is solved in the present invention which essentially provides bumper assemblies each of which comprises a rubber or like resilient body having a built-in snap fastener stud and a correlated anchored resilient means such as a coil compression spring acting supplementary to and in the direction of the holding action of the snap fastener to provide for anti-rattle engagement of the bumper with the closed hood at all times.

The major object of the invention is to provide a novel anti-rattle bumper assembly wherein the head of a snap fastener is imbedded in a solid body of tough resilient rubber or like resilient material.

A further object of the invention is to provide a unique bumper assembly comprising in novel association a body of compressible material, a spring stud fastener imbedded at one end in the body, and a resilient member anchored in the body and extending along the stud.

It is a further object of the invention to provide a novel bumper assembly wherein an essentially solid body of rubber or like resilient material has a snap fastener head imbedded therein so that the spring stud of the fastener projects from the body, and a coacting compression spring is seated on the body, at and preferably surrounding the stud to extend therealong.

Further objects of the invention will appear as the description proceeds in connection with the appended claims and the annexed drawing wherein:

Figure 1 is a diagrammatic top plan of an opening such as the vehicle motor access opening with several bumper assemblies illustrative of the invention mounted therealong;

Figure 2 is an enlarged fragmentary view partly broken and sectioned to show the self-adjustment action of bumpers embodying the invention;

Figure 3 is a further enlarged and broken away section showing detail of a bumper assembly according to a preferred embodiment of the invention;

Figure 4 is a bottom plan view of the assembly of Figure 3;

Figure 5 is a top plan view of the snap fastener of Figure 4 part from the assembly;

Figure 6 is a partially broken away and sectioned view of a further embodiment of the invention; and Figure 7 shows a special form of bumper assembly without the coil spring.

Figure 1 illustrates a practical application of the invention. The vehicle body 11 has an edge flange or like support 12 on which are mounted in spaced succession a series of bumper assemblies 13. These bumper assemblies are engaged by the downwardly facing peripheral edge surface of a hood 14 having a rearward hinge (not shown) and a forward latch structure adapted to enter an opening in the body. In the vehicle assembly, the latch holds the hood against undesired opening, but contact along the hood and body opening edges during movement of the vehicle will produce such undesirable rattling that bumper assemblies 13 are used in an effort to eliminate the noise.

When the hood is closed its peripheral edge surface 17 seats on the tops of bumper assemblies 13, and a good tight contact between the hood and each bumper assembly is provided according to the invention.

Each bumper assembly 13 consists of a compressible cushion body 18 of rubber, synthetic rubber, resilient plastic or like relatively tough resilient material, a snap fastener spring stud 19 and a coacting resilient means such as spring 21 to control self-adjustment.

In the preferred embodiment the body 18 is a molded thick solid disc of tough synthetic rubber, having an upper face 22 for engagement with the hood and a lower face 23. A snap fastener unit having a head 24 imbedded in the body 18 near face 23 has stud 19 rigid with head 24 and projecting at about right angles centrally of body 18.

The illustrated fastener unit is made from a sheet metal blank and consists of flat head 24 and two flat parallel overlapping integral legs 25 and 26 which are bent at right angles to the head and make up stud 19. The lower ends of legs 25 and 26 have curved edges 27 and 28 respectively that diverge with respect to head 24, and edges 27 and 28 are almost laterally aligned at adjacent ends so that they coact to form a nose section adapted to enter openings 30 along body. Legs 25 and 26 are formed with shoulders 31 and 32 axially facing the head 24, and in the assembly these shoulders are adapted to hook under and engage the bottom surface of body flange 12 as shown in Figure 2. This fastener unit is of the general one-piece metal type shown in United States Letters Patent to Johnson No. 1,947,130, issued February 13, 1934, to which reference is made for detail.

Surrounding stud 19 is coil spring 21 which has one or more end coils at 33 imbedded in body 18, and its other end terminates in a flattened coil at 34 short of shoulders 31, 32 so that it will not interfere with the initial stud nose entering action. Coil spring 21 is made of relatively stiff wire and provides a powerful compression spring acting axially of the stud 19 in the assembly. Neither stud 19 nor spring 21 have any appreciable lateral bending with respect to body 18, so sturdily are they anchored therein.

In use each bumper assembly 13 is mounted on the body by inserting the stud nose 27, 28 in circular aperture 30 and pressing down until the stud enters the aperture and shoulders 31, 32 are located on the opposite side of flange 12. As legs 25, 26 enter aperture 30, engagement of surfaces 27, 28 with the aperture edges cams the legs toward each other with a scissors-like action to laterally compress spring stud 19, this being permitted by the slitted head 24 as explained in the Johnson patent, until shoulders 31, 32 which are in lateral alignment clear aperture 30, at which time the stud 19 laterally expands by legs 25, 26 spring outwardly. The assembly can then be released, and since spring 21 has been compressed axially during the stud insertion it acts to pull shoulders 31, 32 into tight contact with the bottom of flange 12. It will be observed that the shoulders 31 and 32, instead of being about parallel to flange 12 as shown may be converging with respect to head 24 as shown in the Johnson patent and aid in this holding action.

All of the bumper assemblies 13 are mounted in place as in Figure 1. When the hood is closed its peripheral surface will engage to top faces 22 of bumper assemblies 13, and should a portion of the hood surface be at a different level, as shown at 17' in Figure 2, such surface will engage the associated bumper assembly and may effect such axial displacement of stud 19 as to separate shoulders 31, 32 from flange 12. Without the coaction of spring 21 this would produce a rattle condition but spring 21 is further compressed at this time and only acts to increase its force axially of stud 19 urging resilient body 18 against the hood so that no rattle noise is possible. The resilience of body 18 axially of stud 19 is such that spring 21 will compress considerably before body 18 becomes solid.

Should surface 17' be a recess, or should top face 22 of one bumper assembly be at a slightly different level than the others, the same action is obtained and as a result in the vehicle, all of the bumpers have their upper faces tight with the hood. This tight engagement is always maintained even though the snap fastener connection may become loose due to repeated hood closures.

In manufacture of each bumper assembly 13 the snap fastener unit and the coil spring are suitably mounted in a fixture and the rubber body 18 is molded in place upon them. These bumper assemblies may be used on doors, trunk lids and other closure places.

Figure 6 shows a further embodiment wherein the fastener unit 35 is of the continuous wire type shown in Place Patent No. 1,679,266, issued July 31, 1928, having its looped head imbedded within body 18 and its diverging-converging leg spring stud projecting therefrom. Here the end of coil spring 21 is effectively imbedded in the body 18 by having its end coil or coils seated in an annular groove 36 surrounding the stud and fixed there either by adhesive or vulcanizing.

Figure 7 illustrates a bumper having a rubber or like body 18 wherein fastener 37 has its flat plate-like head (like that of Figure 5) imbedded in the body 18 and the spring stud consisting of integral legs 39 and 41 projects axially thereof. In this structure the fastener legs are formed as shown in said Johnson patent, with converging aperture entrance tip surfaces, and when the assembly is mounted the expanding stud engages diverging leg edges 42, 43 with the edges of the flange openings to axially hold the assembly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A bumper assembly comprising a compressible body of relatively tough resilient material, a snap fastener having a head imbedded in said body and a contractible and expansible shank projecting away from a face of said body, and a compression spring anchored to said body at said face and extending along at least part of the length of said shank outside the body.

2. The bumper assembly defined in claim 1 wherein said body is a molded block of rubber or rubber-like plastic material.

3. A bumper assembly comprising a body of compressible material, a snap fastener stud projecting from a face of said body and comprising relatively movable spaced legs imbedded at adjacent ends in said body, and a compression spring having an end anchored in said body and projecting from said face surrounding and substantially parallel to said stud.

4. A bumper assembly comprising a compressible body, a snap fastener unit having an enlarged head permanently imbedded in said body and a spring stud projecting from a face of said body, and a compression spring having one end imbedded in said body and surrounding and extending along said stud.

5. A bumper assembly comprising an enlarged cushion body of rubber or rubber-like plastic material, a snap fastener unit having a transverse head imbedded in said body adjacent one face of said body and a stud comprising spaced spring legs extending from said head through said face and away from said body, and a compression spring surrounding said stud anchored at one end in said body at said face.

6. The bumper assembly defined in claim 5 wherein said spring is more resilient than said body in the direction of the length of said stud.

7. The bumper assembly defined in claim 5, wherein said body is molded upon the fastener unit head and the anchored end of said spring.

8. The bumper assembly defined in claim 5, wherein said stud has a converging nose portion at its end remote from the cushion body, and said spring terminates short of said stud nose portion.

9. A bumper assembly comprising a cushion block of rubber or rubber-like plastic material, a snap fastener unit having a transverse head imbedded in said block and a spring stud projecting from said head through said face and away from the block, said stud having shoulders facing said head in spaced relation to said face, and a coiled compression spring surrounding said stud in spaced relation thereto with one end anchored in said block at said face.

10. In the bumper assembly defined in claim 9, said spring terminating in a flat coil short of said shoulders.

11. A bumper assembly comprising an enlarged cushion body of rubber or rubber-like plastic material, a snap fastener unit having a transverse head imbedded in said body adjacent one face of said body and a stud comprising spaced spring legs extending from said head through said face and away from said body, and a compression spring surrounding said stud anchored in said body at said face, said body face having an annular groove surrounding the fastener stud, and said spring end being secured within said groove.

(References on following page)

References Cited in the file of this patent

UNITED STATES PATENTS

| | | |
|---|---|---|
| 1,469,693 | Cloud | Oct. 2, 1923 |
| 1,679,266 | Place | July 31, 1928 |
| 1,947,130 | Johnson | Feb. 30, 1934 |
| 2,128,656 | Long | Aug. 30, 1938 |
| 2,167,263 | Bumpus et al. | July 25, 1939 |
| 2,455,669 | Gagnier | Dec. 7, 1948 |
| 2,703,428 | Redmond et al. | Mar. 8, 1955 |
| 2,761,718 | Tool | Sept. 4, 1956 |

FOREIGN PATENTS

| | | |
|---|---|---|
| 335,050 | Great Britain | Sept. 18, 1930 |